United States Patent [19]

Ringrose et al.

[11] 4,355,956

[45] Oct. 26, 1982

[54] WIND TURBINE

[75] Inventors: James R. Ringrose; Leonard G. Dahle, both of Portland, Oreg.

[73] Assignee: Leland O. Lane, Newport, Oreg.; by said James R. Ringrose

[21] Appl. No.: 106,919

[22] Filed: Dec. 26, 1979

[51] Int. Cl.³ .............................................. F03D 3/06
[52] U.S. Cl. ................... 416/132 B; 416/119; 416/240
[58] Field of Search ............... 416/132 B, 132 A, 119, 416/240 A

[56] References Cited

U.S. PATENT DOCUMENTS

| | | | |
|---|---|---|---|
| 2,622,687 | 12/1952 | Cohen | 416/119 X |
| 2,661,068 | 12/1953 | Gaskill | 416/169 A |
| 3,044,557 | 7/1962 | Posh | 416/132 A |
| 3,850,545 | 11/1974 | Weir | 416/132 A |
| 3,976,396 | 8/1976 | Antogini | 416/119 |
| 3,995,170 | 11/1976 | Graybill | 416/119 X |
| 4,048,947 | 9/1977 | Sicard | 416/240 A X |
| 4,050,246 | 9/1977 | Bourquardez | 416/240 A X |
| 4,086,023 | 4/1978 | Morgan | 416/197 A X |
| 4,130,380 | 12/1978 | Kaiser | 416/119 X |
| 4,168,439 | 9/1979 | Palma | 416/DIG. 4 |

FOREIGN PATENT DOCUMENTS

| | | | |
|---|---|---|---|
| 2827044 | 12/1978 | Fed. Rep. of Germany ... | 416/240 A |
| 939847 | 11/1948 | France | 416/132 X |
| 2288877 | 5/1976 | France | 416/132 B |
| 2291381 | 6/1976 | France | 416/240 A |
| 2298707 | 8/1976 | France | 416/240 A |

*Primary Examiner*—Everette A. Powell, Jr.
*Attorney, Agent, or Firm*—Klarquist, Sparkman, Campbell, Leigh, Whinston & Dellett

[57] ABSTRACT

A vertical axis wind turbine includes a rotating frame carrying a plurality of flexible, resilient blades rigidly secured at their leading edges to the rotating frame. The trailing edges of the blades, which are free to flex, react to the wind for producing a force in the direction of rotation of the frame. As the blades rotate through one hundred eighty degrees they change orientation and continue to receive the air current in proper relation for driving the frame forwardly.

10 Claims, 11 Drawing Figures

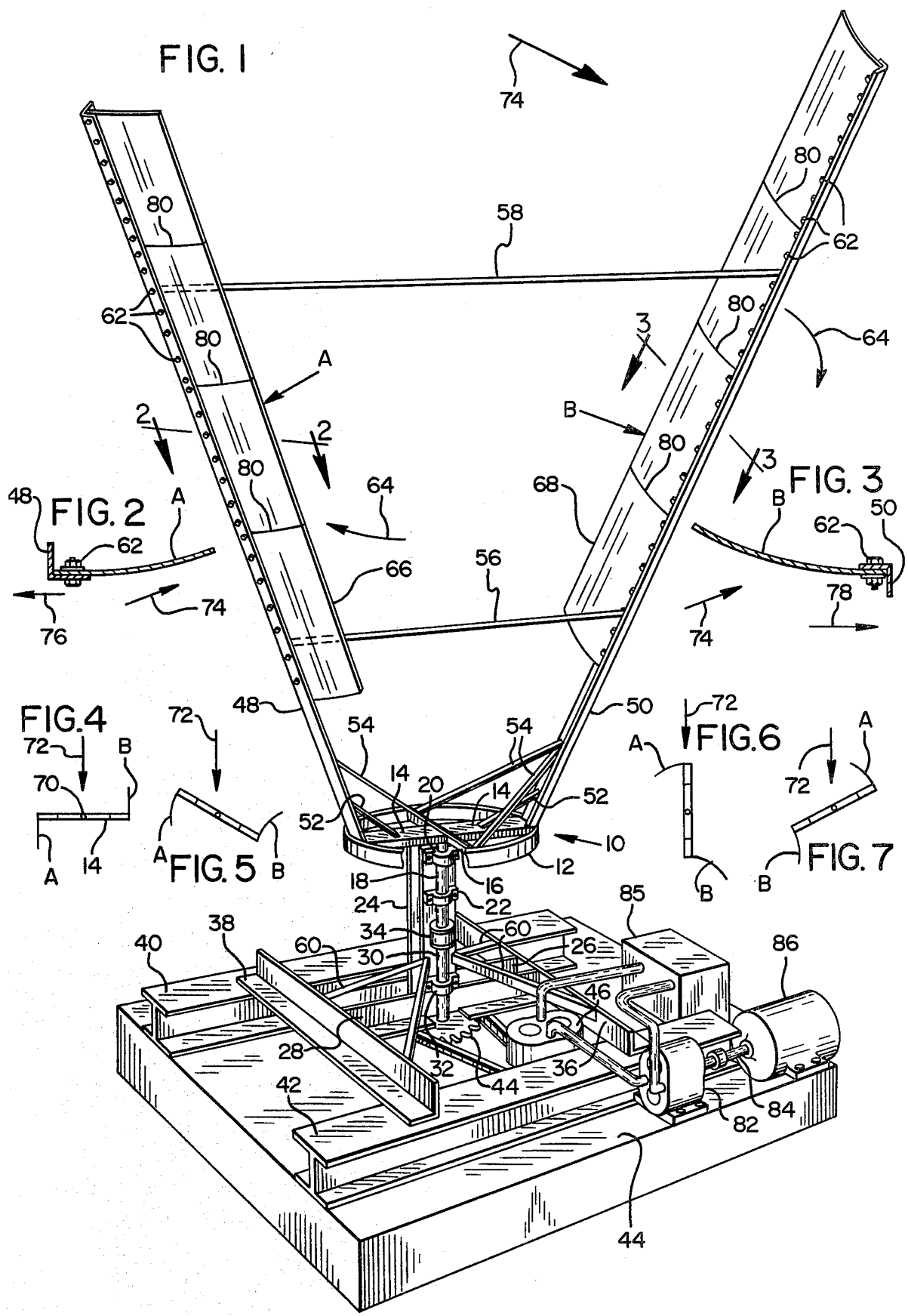

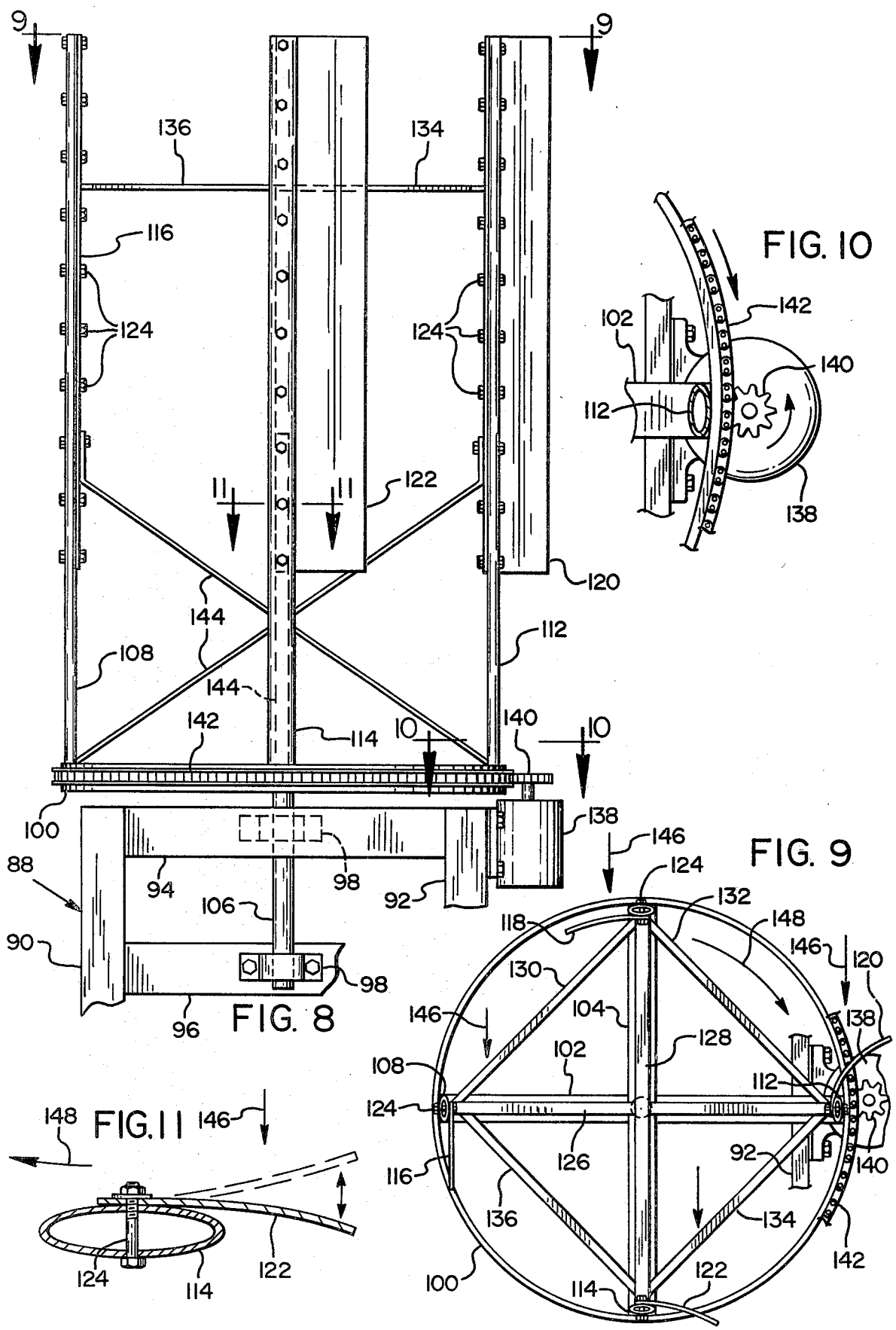

WIND TURBINE

BACKGROUND OF THE INVENTION

The present invention relates to a wind turbine and particularly to a wind turbine of economical construction for generating substantial amounts of power.

With the demand for power exceeding the supply from conventional sources, alternative sources have been discussed including wind as a source of power. Windmills have long been employed for pumping water and for the generation of electric power to some extent, but fall short of modern power demands because of the cost of construction or the limited practical amount of power which is usually generated.

More recently, large windmills have been proposed which are in the nature of tower-mounted propellers adapted to rotate at relatively high speed. Not only is the tower relatively expensive, if a large propeller span is contemplated, but also a mechanism must be provided for rotating the propeller to face the prevailing winds. The expense tends to relegate these devices to the experimental category since the cost per kilowatt hour is likely to be high compared with the cost of conventional sources. Moreover, devices designed to turn at several times the wind speed in moderate wind velocities are not well-adapted for operation in really high winds. Thus, at wind speeds above approximately 35 mph, some devices are likely to be shut down because of the excessive blade tip speed which would be encountered. Some windmill devices have been proposed which operate on a vertical shaft and therefore do not require a high tower but these are not self starting or proper blade orientation becomes a problem, and the mechanism employed can become relatively complex.

SUMMARY OF THE INVENTION

In accordance with the present invention, a wind turbine includes a rotating frame having a predetermined axis of rotation, said frame supporting at least one blade formed of a flexible, resilient material located radially outwardly from the axis of rotation of the frame. The blades are suitably formed from a tough, flexible, resilient plastic sheet material, with the leading edge of the blade having a rigid connection with the rotating frame. The trailing edge of the blade, that is the edge rearward with respect to the direction of frame rotation, is unrestrained and is allowed to flex in response to wind pressure thereagainst such that a component of force is produced in the direction of frame rotation. The blades are to a degree self-trimming, and change in direction in response to wind pressure and their own restoring force whereby the blade will flex in one direction when the direction of air current is relatively toward the frame axis from the blade, and will flex in the opposite direction as air current is relatively toward the blade from the axis of the frame. Thus, the blade continues to provide torque for substantially three hundred sixty degrees of frame rotation.

Advantageously, a plurality of blades are used in a balanced array, each blade preferably being located on the diametrically opposite side of the frame from another blade. The blades may be oriented in vertically parallel relation to the frame axis, or may extend upwardly and outwardly from a relatively small rotating base. The rotating frame can drive an electrical generator for producing power directly, of a hydraulic motor operating a generator or the like. Alternatively, the wind turbine can be used to pump water or for any other power producing purpose, or may even be employed simply for rotation as in the case of a revolving sign.

The construction employed is quite economical and results in the production of substantial power at very low cost. Moreover, the turbine operates over a comparatively narrow speed range from about half wind speed to about wind speed in higher winds, and need not have its operation curtailed at higher wind velocities. The turbine device is adapted to produce relatively high torque at a relatively low rotational speed as compared with known devices.

It is accordingly an object of the present invention to provide an improved wind turbine which is adapted to supply substantial power for a reasonably low construction cost.

It is another object of the invention to provide an improved wind turbine adapted for rotation on a vertical axis.

It is another object of the present invention to provide an improved wind turbine which rotates at a moderate speed and which is operable over a wide range of wind velocities.

The subject matter which we regard as our invention is particularly pointed out and distinctly claimed in the concluding portion of this specification. The invention, however, both as to organization and method of operation, together with further advantages and objects thereof, may best be understood with reference to the following description taken in connection with the accompanying drawings wherein like reference characters refer to like elements.

DRAWINGS

FIG. 1 is a perspective view, partially broken away, of a wind turbine according to a first embodiment of the present invention;

FIG. 2 is a cross-section taken at 2—2 in FIG. 1;

FIG. 3 is a cross-section taken at 3—3 in FIG. 1;

FIG. 4 is an explanatory or schematic drawing illustrating blade orientation for a first rotational position of the turbine according to the present invention;

FIG. 5 is a similar schematic drawing showing blade orientation for a second rotational position of the turbine according to the present invention;

FIG. 6 is a similar schematic drawing illustrating blade orientation for a third rotational position of the turbine according to the present invention;

FIG. 7 is a similar schematic drawing showing blade orientation for a fourth rotational position of the turbine according to the present invention;

FIG. 8 is a side view, partially broken away, of a wind turbine according to a second embodiment of the present invention;

FIG. 9 is a top view, partially broken away, of the FIG. 8 turbine;

FIG. 10 is a cross-sectional view, partially broken away, taken at 10—10 in FIG. 8; and FIG. 11 is a cross-sectional view taken at 11—11 in FIG. 8.

DETAILED DESCRIPTION

Referring to the drawings and particularly to FIG. 1, a wind turbine according to an embodiment of the present invention includes a rotating frame comprising a rotatable base 10 provided with a circular rim 12 which is supported by mutually perpendicular cross members 14 and 16. The cross members are centrally mounted on the upper end of a vertical shaft 18 carried by thrust bearings 20 and 22, the bearings being attached to one flange of upstanding H beam 24. The lower end of H beam 24 is secured between vertical flanges of angle members 26 and 28 with the lower flange of angle member 28 cut away at the center for passing an extension shaft 30 joined to shaft 18 by means of coupling 34 and turning in bearing 32. The lower end of extension shaft 30 carries a sprocket 44 having a chain drive connection to a smaller sprocket positioned on the shaft of a generator or hydraulic pump 46.

The ends of angle members 26 and 28 are joined in perpendicular relation to the upwardly extending flanges of angles 36 and 38. Angles 36 and 38 in turn bridge between parallel H beams 40 and 42 mounted on concrete slab 44, wherein the lower angle flanges are secured to the H beams. Angular braces 60 extend upwardly from spaced locations on the upper flanges of angles 36 and 38 to opposite edges of the forward flange of H beam 24 whereby to provide additional stability to the upwardly extending H beam. H beam 24 and supporting structure comprise the support base for the turbine device according to the present embodiment.

The rotating frame is further provided with a pair of outwardly and upwardly extending arms 48 and 50, each comprising an angle member and each being attached to the rotatable base at a location where cross member 14 joins rim 12. Each of the arms 48 and 50 in this embodiment makes an angle of sixty degrees with the horizontal, and each arm is further supported by an angular center brace 52 extending from cross member 14, about half way between cross member 16 and rim 12, to arm 48 at a point which is a similar distance from rim 12. Side braces 54 join either end of cross member 16 to each arm at a point on the arm spaced up from rim 12 by a distance approximating the radius of rim 12. The arms 48 and 50 which are suitably about twenty feet long and joined at spaced locations therealong by cross braces 56 and 58. Rotatable base 10 is suitably about five feet in diameter. The measurements mentioned herein are by way of example for a particular embodiment and are not to be taken in a limiting sense. The center braces 52, the cross braces 54, and cross braces 56, 58 are formed from flat bar material, and it is understood the entire structure as thus far described, with the principal exception of slab 44, comprises a welded steel construction.

Each of the arms is provided with a flexible blade, blade A for arm 48 and blade B for arm 50, and forward edges of these blades are rigidly secured by a series of rivets or bolts 62 to the tangential flanges of the corresponding arm angles, i.e. the angle flanges which approximately parallel the rim 12. The wind turbine device according to the present embodiment is designed to rotate in a clockwise direction when viewed from the top, that is, in the direction of arrows 64, and accordingly it will be seen it is the forwardly moving or leading edge of each of the blades A, B that is rigidly joined to the associated arm, while the trailing edges 66 and 68 are non-secured and are thus free to move. The blades are formed from a tough, flexible and resilient sheet material that is capable of flexing back and forth an innumerable number of times without changing properties, while also normally providing a restoring force tending to cause the blade to assume a flat, at-rest position. The blade in the at-rest position is in substantially parallel alignment with the tangential flange of the arm angle onto which the blade is secured.

The material from which the blades are formed is suitably a plastic sheet material known as Lexan, which comprises a thermoplastic polycarbonate condensation product of bisphenol-A and phosgene. Another advantageous material comprises a product identified as UHMW polyethylene, or ultrahigh molecular weight polyethylene, available from Port Plastics, Portland, Oreg. The thickness of the sheet material is suitably from approximately one-eighth inch to one-fourth inch. The tough, flexible, resilient plastic sheet material continues to return to its original shape after indefinite flexing and continues to provide a restoring force reacting against wind pressure for bringing about movement of the turbine frame according to the present invention. The restoring force provides self trimming of the blades and a change in blade flexing direction with turbine rotation as hereinafter more fully described.

Referring to the explanatory drawing of FIG. 4, the at-rest position of blades A and B is seen to be in perpendicular relation to cross member 14, the latter extending along the diameter of rotatable base 10. Thus, the blades are normally substantially perpendicular to the radial direction between the axis of rotation and the blade at the location where the blade is rigidly connected. The frame is designed to rotate about axis 70 defined by shaft 18, and successive positions of the blades A and B are schematically illustrated in FIGS. 5 through 7 for a wind direction indicated at 72. It is seen the blades A and B flex along their length, especially toward their unrestrained trailing edges in response to the force of the wind thereagainst. This flexure is also illustrated in greater detail in FIGS. 2 and 3.

For the direction of wind illustrated approximately at 74 in FIG. 1, blade A will flex in the direction of the radial flange of arm 48 as illustrated in FIG. 2, and blade B will flex away from the radial flange of arm 50 as illustrated in FIG. 3. The force of the wind produces a component of force in tangential direction 76 in FIG. 2 and tangential direction 78 in FIG. 3, in each case forcing rotation of the frame about the axis 70 of shaft 18, thereby rotating such shaft.

Approximately the same orientation of the blades with respect to the wind is illustrated in FIG. 5 and in FIGS. 1-3, and a further sequence of rotation is illustrated in FIGS. 6 and 7. It will be seen blades A and B maintain the same flexing direction relative to the axis of rotation through approximately one-hundred and eighty degrees of rotation, and then return to the position illustrated in FIG. 4. The blades exchange their flexing directions during the next one-hundred and eighty degrees of rotation, i.e., such that blade A flexes away from the radial flange of arm 48 and blade B flexes toward the radial flange of arm 50. Stated another way, each of the blades flexes toward the axis of rotation as the direction air current is toward the axis from the blade, and flexes in the opposite direction as the air current is toward the blade from the axis of rotation, in each case providing a component of force against the frame in the direction of rotation. It will be appreciated the blades operate in the manner of sails on a sailing vessel and are, to a degree, self trimming so as to catch the wind and urge the frame in a clockwise direction.

The position of the blades illustrated in FIG. 4 is theoretical except for a condition of zero wind velocity. Thus, as the frame continuously rotates about axis 70, blade A quickly switches from an orientation catching the wind on one side to an orientation catching the wind on the other side and makes a quite audible air sound as it changes in orientation. The blade rapidly changes direction as its restoring force tends to overcome wind pressure and as the free end of the blade becomes oriented toward the wind, and the wind and restoring force whips the blade toward the opposite orientation. The orientation of blade B (in going toward the wind) changes more gradually. Again, it will be appreciated blades A and B exchange their relative positions for a following one-hundred and eighty degrees of rotation.

Although the embodiment of FIG. 1 is illustrated for two blades, one on each side of the frame, it will be appreciated a greater or lesser number of blades may be employed. For instance, it is quite possible to employ one blade, or three or four blades as desired. Generally, a balanced construction of two or four blades at spaced locations around the frame is preferred.

The angular outward orientation of the arms in FIG. 1 has some advantage in that the rotatable base 10 can be relatively small in diameter for supporting blades extending outwardly to a considerable radius to provide appreciable torque. The rotatable base 10 does not have to be radially large nor as heavy in construction as if it extended to the same radius as the top of each of the arms 48 and 50. Although the blades A and B have been described as unitary structures, it will be observed each one is suitably split, as at 80, in a direction perpendicular to the arms at spaced locations therealong to allow for different amounts of flexing. Each of the blade portions is suitably about two feet wide in the direction from leading edge to trailing edge, and each blade portion suitably has a length of from four to five feet. These dimensions are not particularly critical, and depend to a degree on the convenient availability of the sheet material from which the blades are manufactured.

The wind turbine according to the present invention is advantageously employed for electric power generation wherein device 46 may comprise an electrical generator, or wherein device 46 comprises a hydraulic turbine or pump providing hydraulic pressure to a hydraulic motor schematically illustrated at 82 which in turn rotates shaft 84 of electrical generator 86. Hydraulic fluid is returned to tank 85 from which fluid is supplied to the pump. The system also suitably includes pressure controlling apparatus (not shown). In addition to the generation of electricity, the device according to the present invention may be employed for pumping water or for boat propulsion, or may even be utilized solely for rotation without the conversion of power as, for example, in the case of a revolving sign.

The construction according to the present invention has the advantage of producing relatively high torque at comparatively low rotational speeds. The tip velocity of the arms and blades is usually less than wind velocity, and approaches wind velocity for higher wind speeds. This compares with propeller devices which often have a tip speed of several times wind velocity. It appears the movement of one of the arms, A or B, toward the direction of the wind, may have a slowing effect on the rotational speed of the device according to the present invention, but nevertheless this arm generates considerable torque since its relative speed approaches twice wind speed. A high tip speed is not required for substantial power generation, and furthermore the apparatus, according to the present invention operating at lower speed, continues to provide considerable power in high winds without the usual problems. Thus, the device operates well at almost any wind speed from approximately 10 to 15 miles an hour up to gale force winds.

Since the device according to the present invention preferably rotates on a vertical shaft rather than a horizontal shaft, no tower is required and no mechanism is needed for orienting blades to face the prevailing wind. Furthermore, no mechanism is required for adjusting blade pitch or the like. These factors as well as simplicity of blade structure and the moderate speed of rotation contribute toward an economical construction, placing the cost of power generated per kilowatt hour at a very low value. The construction can be expanded to relatively large physical sizes without excessive costs. For the embodiment illustrated, power can be generated approximating 1.5 KW for a wind speed of 15 miles per hour and ranging to approximately 50 KW for a wind speed of 45 miles per hour. One advantageous location for this type of device has been found to be along the northwestern coast of the United States where appreciable and constant wind speeds are common.

Although the device according to the present invention is designed to rotate about a vertical axis, thereby eliminating the requirement for a sizable tower, it will nevertheless be appreciated the device can be oriented with its axis horizontal if so desired. The device at least as thus far described will operate at nearly any orientation.

A second embodiment of the wind turbine according to the present invention is illustrated in FIGS. 8 through 11. This embodiment includes a support base 88 comprising left and right structural members 90 and 92 which support intermediate members 94 and 96 extending horizontally therebetween. Thrust bearings 98 are joined to intermediate members 94 and 96 at the vertically-spaced locations for rotatably receiving shaft 106. A rotating frame comprises a rotatable base consisting of a circular rim 100 which is supported by mutually perpendicular cross members 102 and 104 centrally mounted upon vertical shaft 106 for rotation therewith. The rotating frame is further provided with four vertically upwardly extending arms 108, 110, 112 and 114, suitably formed of structural members which are oval or air foil shaped in cross section and which are secured to the inside of rim 100 where the same joins the ends of cross members 102 and 104.

The rotatable frame further includes diagonal braces 144 in each case extending from the lower end of a vertical arm to a point about two-fifths the way up the opposite arm. The diagonal braces are joined in the center of the structure to each other, and may be joined as well to shaft 106 which suitably extends upwardly to this point. About one-fifth of the way from the top of the frame, horizontal cross-braces 126 and 128 join opposite vertical arms, said cross-braces being centrally secured to one another. Additional cross-braces 130, 132, 134 and 136 are positioned between adjacent arms. The frame and structural support members employ welded steel construction as in the previous embodiment.

The vertical arms 108, 110, 112 and 114, which are parallel to shaft 106, are respectively provided with flexible blades 116, 118, 120 and 122 having their leading edges rigidly secured to the arms by a series of bolts 124, each of the blades being formed of a tough, flexible and resilient sheet material as in the previous embodiment. The trailing edges of the blades are unrestrained to allow flexure, it being understood the device rotates in a clockwise direction when viewed from the top. The blades, which are suitably approximately two feet wide between leading and trailing edges and approximately eight feet long, are secured along the upper portions of the vertical arms. The arms are positioned at equal spaced, diametrically opposite locations with respect to the rotatable base, and consequently the four blades of this embodiment are equally spaced around the device.

This embodiment of the invention is provided with an electrical generator 138, the shaft of which carries a sprocket 140 engaging the outer edge of roller chain 142 welded to the outer perimeter of rim 100. Thus, rotation of the frame in a clockwise direction rotates the shaft of generator 138 in a counterclockwise direction.

The operation of the wind turbine according to this embodiment is substantially similar to that of the previous embodiment. For a wind direction as indicated at 146 in FIG. 9, the blades 116, 118, 120 and 122 will flex as illustrated in FIG. 9, assuming blade 120 has just changed its position as the wind engages its inner side. In any case, the force of the wind against the flexed blades produces rotation in a clockwise direction as noted at 148 by virtue of a component of force in the direction of the leading edge of the blade, e.g. to the left, in FIG. 11, which illustrates blade 122.

The embodiment of FIGS. 8-11 has the advantage of being somewhat more compact than the previous embodiment, for a comparably-sized rotating base. It will be appreciated the present invention is not restricted to these two particular configurations. Moreover, the generator 138 in the second embodiment is suitably replaceable with a hydraulic pump or any other form of power transferring device. Alternatively, the device can simply be employed for its rotational properties.

While we have shown and described plural embodiments of our invention, it will be apparent to those skilled in the art that many changes and modifications may be made without departing from our invention in its broader aspects. We therefore intend the appended claims to cover all such changes and modifications as fall within the true spirit and scope of our invention.

What is claimed is:

1. A wind turbine for producing rotary motion in response to air currents, comprising:

a rotating frame having an axis of rotation and a first direction of rotation about said axis, and a base for rotatably supporting said frame, said frame having a plurality of rigid arms fixedly attached thereto, said arms extending angularly outwardly from said axis of rotation, each making an acute angle with said axis of rotation, and a plurality of blades located radially outwardly from said axis of rotation of said frame, each being attached to a said rigid arm, each said blade being supported by a said arm for movement in said first direction of rotation about the axis of said frame, each said blade having a rigid connection with a said arm, and each said blade having a trailing portion rearward of said rigid connection in respect to said direction of rotation which is formed of tough, flexible, resilient, plastic sheet material free to flex in response to air currents encountered by said blade, while having substantial restoring force to be substantially flat and having a lateral cross section in generally perpendicular relation to a radial direction between said axis and said blade when said blade portion is in an at-rest condition, wherein said blade portion flexes in one direction for part of a revolution of said frame when said air currents are in a relative direction toward said axis from said blade and flexes in the opposite direction when air currents are in a relative direction toward said blade from said axis for providing a component of force in said first direction of rotation.

2. The turbine according to claim 1 wherein said blade is rigidly attached to said frame proximate the forward leading edge of said blade, forming said rigid connection.

3. The turbine according to claim 1 wherein said axis of rotation is vertical.

4. The turbine according to claim 1 wherein said blades are split perpendicularly to said arms at spaced locations along said arms to allow for different amounts of flexing movement of said blades.

5. The turbine according to claim 1 further including an electrical generator, and a driving connection between said rotating frame and said electrical generator for operating said electrical generator in response to rotation of said frame about said axis.

6. The turbine according to claim 1 further including a hydraulic pump, and a driving connection between said rotating frame and said hydraulic pump for operating said hydraulic pump to pump hydraulic fluid in response to rotation of said frame about said axis.

7. The turbine according to claim 6 further including a hydraulic motor receiving hydraulic fluid from said pump, and an electrical generator operated by said hydraulic motor.

8. The turbine according to claim 1 wherein said rotating frame comprises a rotatable base and a shaft secured thereto wherein said shaft defines the axis of rotation, and bearing means for supporting said shaft.

9. The turbine according to claim 8 further including an electrical generator and a driving connection between said shaft and said electrical generator for operating said generator in response to rotation of said frame about the axis of said shaft.

10. The turbine according to claim 8 further including a hydraulic pump and a driving connection between said hydraulic pump and said shaft for operating said hydraulic pump in response to rotation of said frame about the axis of said shaft.

* * * * *